(12) United States Patent
Wang et al.

(10) Patent No.: US 8,158,261 B2
(45) Date of Patent: Apr. 17, 2012

(54) GLASS-CERAMIC COMPOSITE ENCAPSULATION MATERIAL

(75) Inventors: Sea-Fue Wang, Taipei (TW); Yun-Ruey Wang, Taipei (TW); Ching-Chin Chuang, Taipei (TW); Chun-Ting Yeh, Taipei (TW)

(73) Assignee: National Taipei University Technology, Taipei (TW)

( * ) Notice: Subject to any disclaimer, the term of this patent is extended or adjusted under 35 U.S.C. 154(b) by 248 days.

(21) Appl. No.: 12/428,018

(22) Filed: Apr. 22, 2009

(65) Prior Publication Data

US 2010/0273632 A1   Oct. 28, 2010

(51) Int. Cl.
*B32B 9/00* (2006.01)
*B32B 17/06* (2006.01)
*B32B 15/00* (2006.01)
*C03C 10/04* (2006.01)
*C03C 10/10* (2006.01)

(52) U.S. Cl. ............... 428/428; 428/432; 501/5; 501/6

(58) Field of Classification Search ............... 501/65, 501/66, 68, 69, 72, 14, 15, 17, 21, 5, 6; 428/426, 428/428, 432

See application file for complete search history.

(56) References Cited

U.S. PATENT DOCUMENTS

| | | | | |
|---|---|---|---|---|
| 3,720,526 A * | 3/1973 | Duke et al. | ............... | 501/6 |
| 4,526,873 A * | 7/1985 | Beall et al. | ............... | 501/5 |
| 6,120,906 A * | 9/2000 | Terashi | ............... | 428/426 |
| 6,124,224 A * | 9/2000 | Sridharan et al. | ............... | 501/15 |
| 6,133,174 A * | 10/2000 | Brodkin et al. | ............... | 501/6 |
| 6,348,427 B1 * | 2/2002 | Hamada et al. | ............... | 501/32 |
| 6,430,966 B1 | 8/2002 | Meinhardt et al. | | |
| 6,497,962 B1 * | 12/2002 | Fujimine et al. | ............... | 428/426 |
| 6,797,048 B2 * | 9/2004 | Hoshikawa et al. | ............... | 106/35 |
| 7,189,470 B2 * | 3/2007 | Cortright et al. | ............... | 429/495 |
| 7,214,441 B2 * | 5/2007 | Cortright et al. | ............... | 429/495 |
| 2006/0019813 A1 * | 1/2006 | Yoshii | ............... | 501/15 |
| 2008/0090715 A1 * | 4/2008 | Badding et al. | ............... | 501/5 |

OTHER PUBLICATIONS

BAS ($BaO.Al_2O_3.SiO_2$)-glasses for High Temperature Applications on Journal of the European Ceramic Society 19 (1999), p. 1101-1104, K. Eichler, G. Solow, R Otschik and W. Schaffrath.

* cited by examiner

*Primary Examiner* — Jerry Lorengo
*Assistant Examiner* — Noah Wiese
(74) *Attorney, Agent, or Firm* — Schmeiser Olsen & Watts LLP

(57) ABSTRACT

A glass-ceramic composite encapsulation material composed of glass matrix materials of $SiO_2$, $Al_2O_3$, BaO and $B_2O_3$, and at least one glass filler selected from the group consisting of kaliophilite ($KAlSiO_4$), leucite ($KAlSi_2O_6$), magnesium oxide (MgO). The glass-ceramic composite encapsulation material according to the invention comprises a high temperature type glass matrix (softening point: 750-850° C.) and a intermediate temperature type glass matrix (softening point: 650-750° C.), and glass filler mixed therein, wherein said glass filler in the high temperature type glass matrix comprises 5% to 20% by volume of the total volume of said glass matrix and glass filler, and the glass filler in the intermediate temperature type glass matrix comprises 0% to 40% by volume of the total volume of said glass matrix and glass filler, and wherein said glass filler has an effect of adjusting the expansion coefficient.

13 Claims, 12 Drawing Sheets

GLASS-CERAMIC COMPOSITE ENCAPSULATION MATERIAL

BACKGROUND OF THE INVENTION

1. Field of the Invention

The invention relates to a glass-ceramic composite encapsulation material, and in particular, to a glass-ceramic composite encapsulation material characterized in that it is prepared by incorporating at least one glass filler selected from the group of $KAlSiO_4$, $KAlSi_2O_6$, and MgO in a Ba—B—Si—Al glass matrix, and is applicable to solid oxide fuel cell technology.

2. Description of the Prior Art

Among various fuel cell technologies, solid oxide fuel cells (SOFC) possess advantages such as high conversion efficiency, a wide selection of fuel sources, and lower material cost. However, its working temperature is very high (about 700° C.-1000° C.), and as a result, in the manufacture of a plate SOFC, a high temperature encapsulation technique is required to fill up interstices between plates with encapsulation materials so as to insulate fuel gas from oxygen. Therefore gas tight layers and joints are necessary between materials. Since the entire SOFC elements is operated under high temperature, under normal starting and stopping conditions, materials may experience temperature cycles ranging from normal and high. As a result, matching the thermal expansion coefficients of the various elements is important. Consequently, some types of encapsulation materials play a role as a buffer to reduce damage to the elements caused by the stress generated from heat expansion and cold shrinkage.

FIG. 1 shows the comparison between the inventive formulation and same similar literature formulation. Glass composition used by K. Eichler was based on Pyrex 7059®. U.S. Pat. No. 6,430,966 disclosed a similar glass formulation but contained no $B_2O_3$, and it is apparent that ranges of its ingredients are: $SiO_2$, 45-70 mol %; $Al_2O_3$, 5-15 mol %, and BaO, 20-50 mol %. Since the softening point of this type of glass is relatively high (780-860° C.), the process of encapsulation requires an increase of temperature up to 1000° C. As a result, materials that use Yttria-Stabilized Zirconia (YSZ) as an electrolyte are considered suitable materials for use in SOFC as these materials operate at a temperature higher than 800° C. In the future, the operating temperature of SOFC will be at about 750° C. or even less, and hence less expensive steels may be selected to be materials of the shell and bipolar plates to further reduce production costs. In contrast, higher temperature Pyrex 7059® glass is unsuitable because of its material cost in manufacture at higher temperatures.

When a glass material is used to seal a solid oxide fuel cell, the mechanism for how to add oxides to lower the softening point of the glass to match the thermal expansion coefficients of the other materials to be encapsulated has not been sufficiently tested. The difference in the expansion coefficient of encapsulation glass and materials to be encapsulated results cracks to form in the barrier. In addition, the use of alumina, boron oxide, barium oxide, silica, kaliophilite ($KAlSiO_4$), leucite ($KAlSi_2O_6$) and magnesium oxide (MgO) in the material have not been adequately tested.

In view of this, the above-described conventional art has many disadvantages and requires a solution.

In light of various disadvantages derived from the above-described methods, the inventor had devoted to improve and innovate, and finally, after studying intensively for many years, successfully developed a glass-ceramic composite encapsulation material according to the invention herein.

SUMMARY OF THE INVENTION

One object of the invention is to provide a glass-ceramic composite encapsulation material characterized in that it can modify and lower the softening point of a glass material, extend the range of operating temperature, and adjust the effect of its expansion coefficient. In addition, one object of this invention is to achieve a glass encapsulation material composite that has a low softening point, good air tightness, a controllable thermal expansion coefficient and compression sealing property.

Another object of the invention is to provide glass-ceramic composite encapsulation material characterized in that it can control the flow range of a glass, prevent it from permeating into other materials due to excess flow, as well being able to accelerate the crystallization of glass, thereby facilitating the conversion an originally unstable glass to a glass-ceramic of in a shorter time period, whereby a the stable glass-ceramic will cause less erosion to nearby elements.

A glass-ceramic composite encapsulation material that can achieve the above-described objects of the invention comprises: glass matrix materials of $SiO_2$, $Al_2O_3$, BaO and $B_2O_3$; and at least one type of glass filler selected from the group consisting of $KAlSiO_4$, $KAlSi_2O_6$, and MgO. The inventive glass-ceramic composite encapsulation material includes high temperature type glass matrix and intermediate temperature type glass matrix mixed with a glass filler, wherein the glass filler in the high temperature type glass matrix comprises 5% to 20% by volume of the total volume of said glass matrix and glass filler, while the glass filler in the intermediate temperature type glass matrix comprises 0% to 40% by volume of the total volume of said glass matrix and glass filler; thereby, the glass-ceramic encapsulation material for a solid oxide fuel cell can readily adjust the softening point and the thermal expansion coefficient.

BRIEF DESCRIPTION OF THE DRAWINGS

These features and advantages of the present invention will be fully understood and appreciated from the following detailed description of the accompanying drawings, wherein.

DETAILED DESCRIPTION OF THE PREFERRED EMBODIMENT

Figure 1:
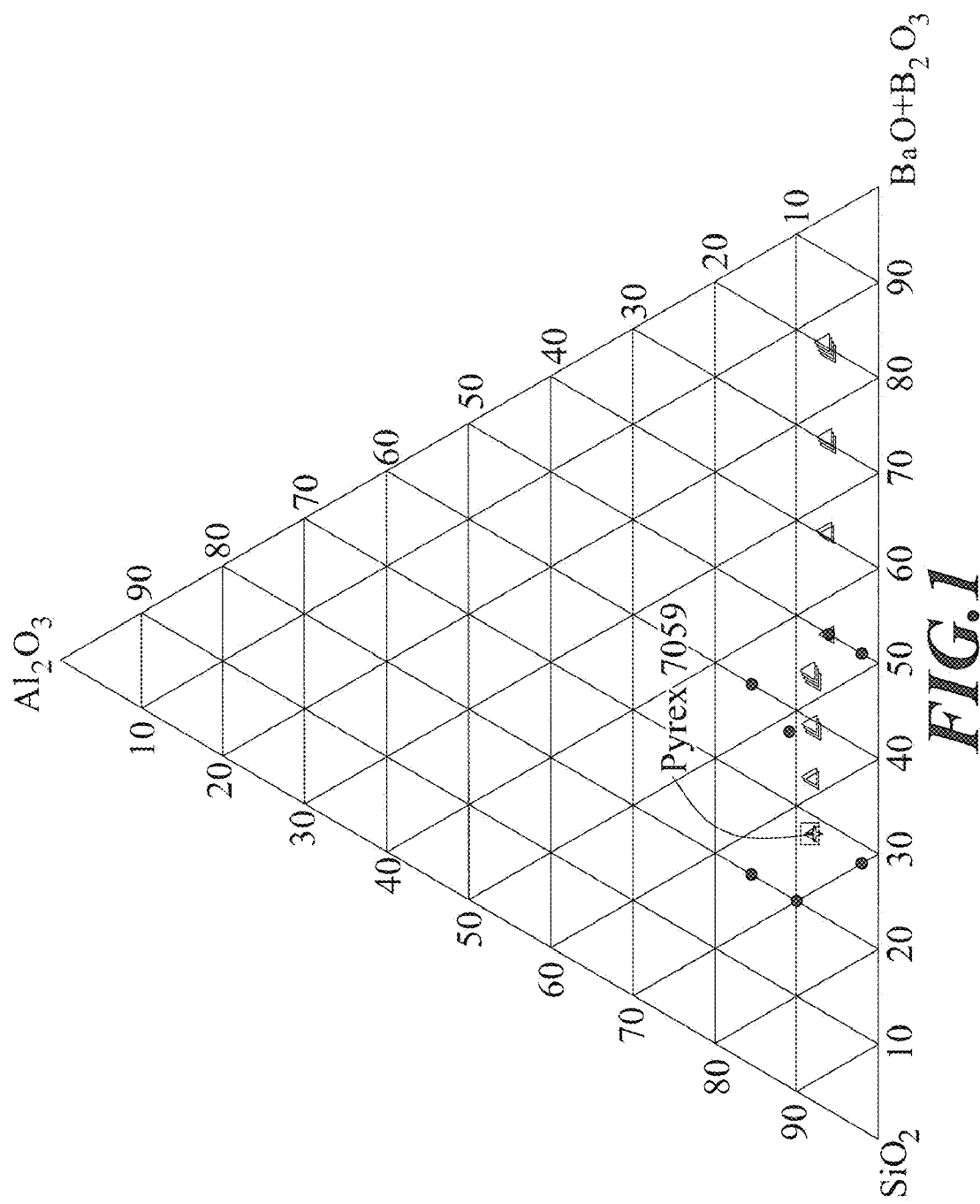
FIG. 1 shows the inventive glass-ceramic composite encapsulation material and a conventional glass system diagram.
Figure 2:
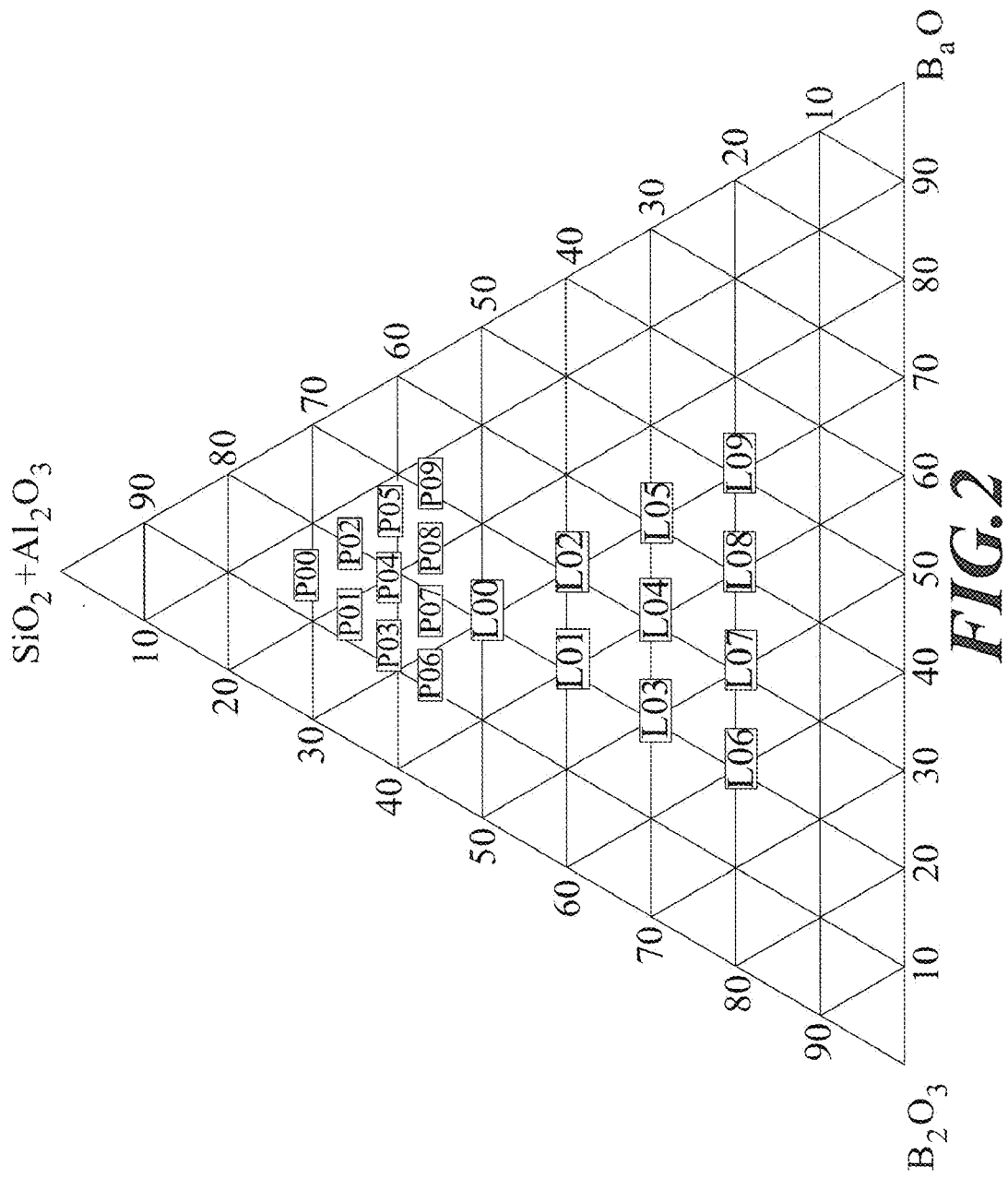
FIG. 2 is a diagram showing the distribution of glass matrix system in the inventive glass-ceramic composite encapsulation material.

FIG. 2 shows a glass matrix system distribution diagram of the inventive glass-ceramic composite encapsulation material. The inventive glass-ceramic composite encapsulation material comprises a glass matrix of $SiO_2$, $Al_2O_3$, BaO and $B_2O_3$, and at least one glass filler selected from the group consisting of $KAlSiO_4$, $KAlSi_2O_6$, and MgO, wherein the glass matrix includes high temperature type glass matrix (softening point: 750-850° C.) and intermediate temperature type glass matrix (softening point: 650-750° C.).

The sum of the mole proportion of the ingredients $SiO_2$ and $Al_2O_3$ composite in the high temperature type glass matrix comprises 50% to 72% of the total mole number of glass matrix, $Al_2O_3$ comprises 3% to 15% of the total mole number of the glass matrix, BaO is a modifier for adjusting the softening point of the glass comprising 10% to 30% of the total mole number of glass matrix; $B_2O_3$ is a modifier for adjusting the softening point of glass comprising 15% to 35% of the total mole number of glass matrix, and at least one filler comprising 20% to 40% by volume of the total volume of the glass is selected from the group consisting of $KAlSiO_4$, $KAlSi_2O_6$, and MgO and is incorporated in the glass matrix to form a glass-ceramic composite encapsulation material with an adjustable expansion coefficient.

The sum of the mole proportions of the ingredients $SiO_2$ and $Al_2O_3$ composite in the intermediate temperature type glass matrix comprises 20% to 50% of the total mole number of the glass matrix, BaO is a modifier for adjusting the softening point of the glass comprising 20% to 50% of the total mole number of the glass matrix, $B_2O_3$ is a modifier for adjusting the softening point of glass comprising 30% to 60% of the total mole number of the glass matrix, and at least one filler comprising 20% to 40% by volume of the total volume of the glass is selected from the group consisting of $KAlSiO_4$, $KAlSi_2O_6$, and MgO and is incorporated in the glass matrix to form a glass-ceramic composite encapsulation material with an adjustable expansion coefficient.

An encapsulation paste comprising a binder that is prepared by the following steps: using polyvinyl acetate (PVAC) as a base; weighing main ingredients of said glass to be formulated; wetting the mixture of main ingredients with alcohol at the proper weight ratio (mix:alcohol=10:4), mixing homogeneously; adding the thus-obtained mixture in said PVAC at a weight ratio of mix:PVAC=10:1; stirring this mixture continuously to increase the viscosity thereof until the resulted slurry becoming a paste; and packing the thus-obtained paste in a syringe that is used to inject at a position to be encapsulated.

The ratio of $SiO_2/B_2O_3$ is an important reference factor in the reduction of the softening point given the reason that $B_2O_3$ is itself a glass structure forming agent and the boron glass itself has a low softening point (about 450-600° C.). Therefore by increasing the ratio of $B_2O_3$ viscosity can be reduced. The glass structure modifier of this system is BaO, and since Ba has a high atomic mass, it possesses a strong potential to disrupt the glass matrix structure, and consequently, the addition of BaO in the glass system can adjust the softening point.

Figure 3:
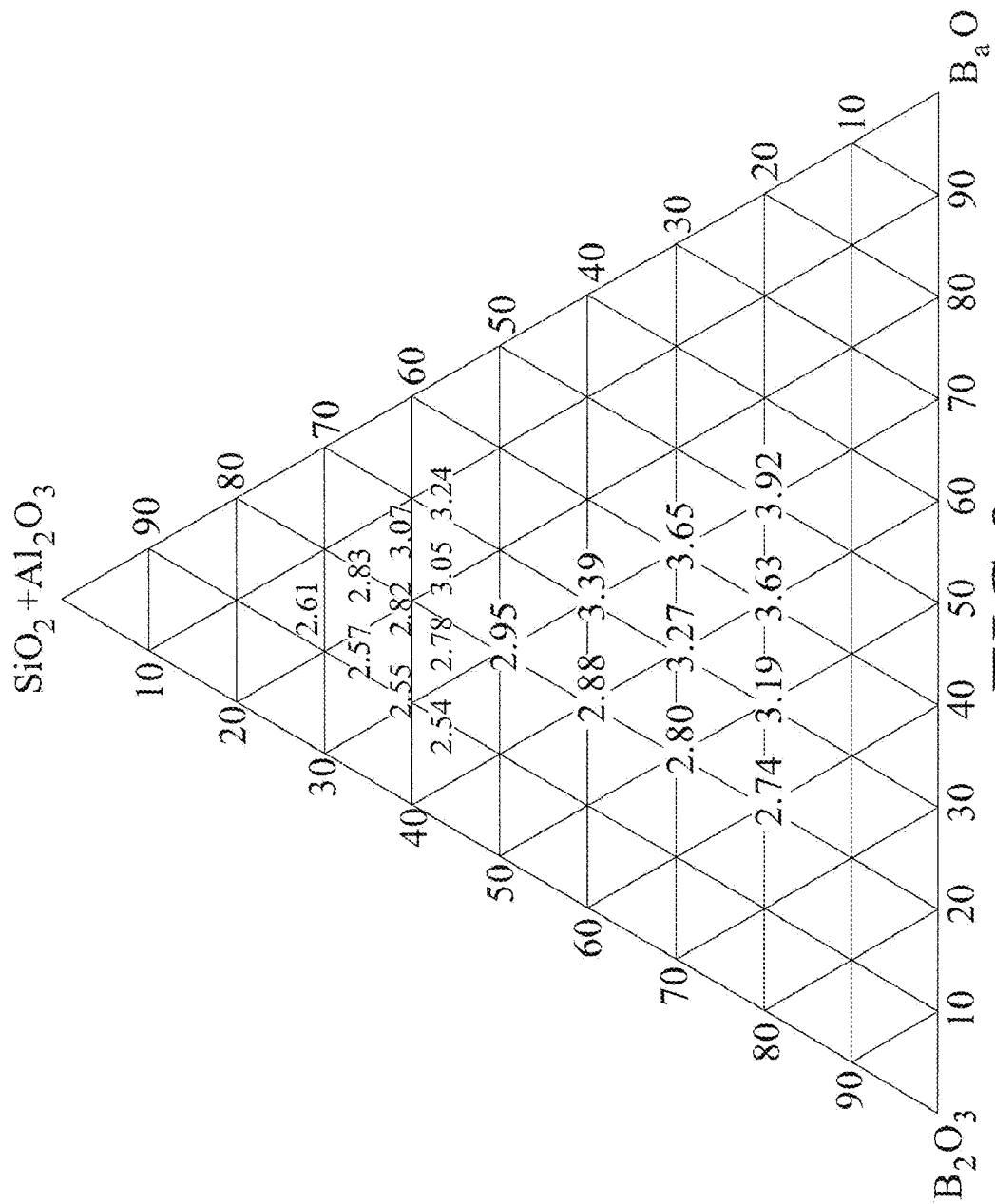
FIG. 3 is a diagram showing the relationship of glass ingredients and specific gravity of the inventive glass-ceramic composite encapsulation material.
Figure 4:
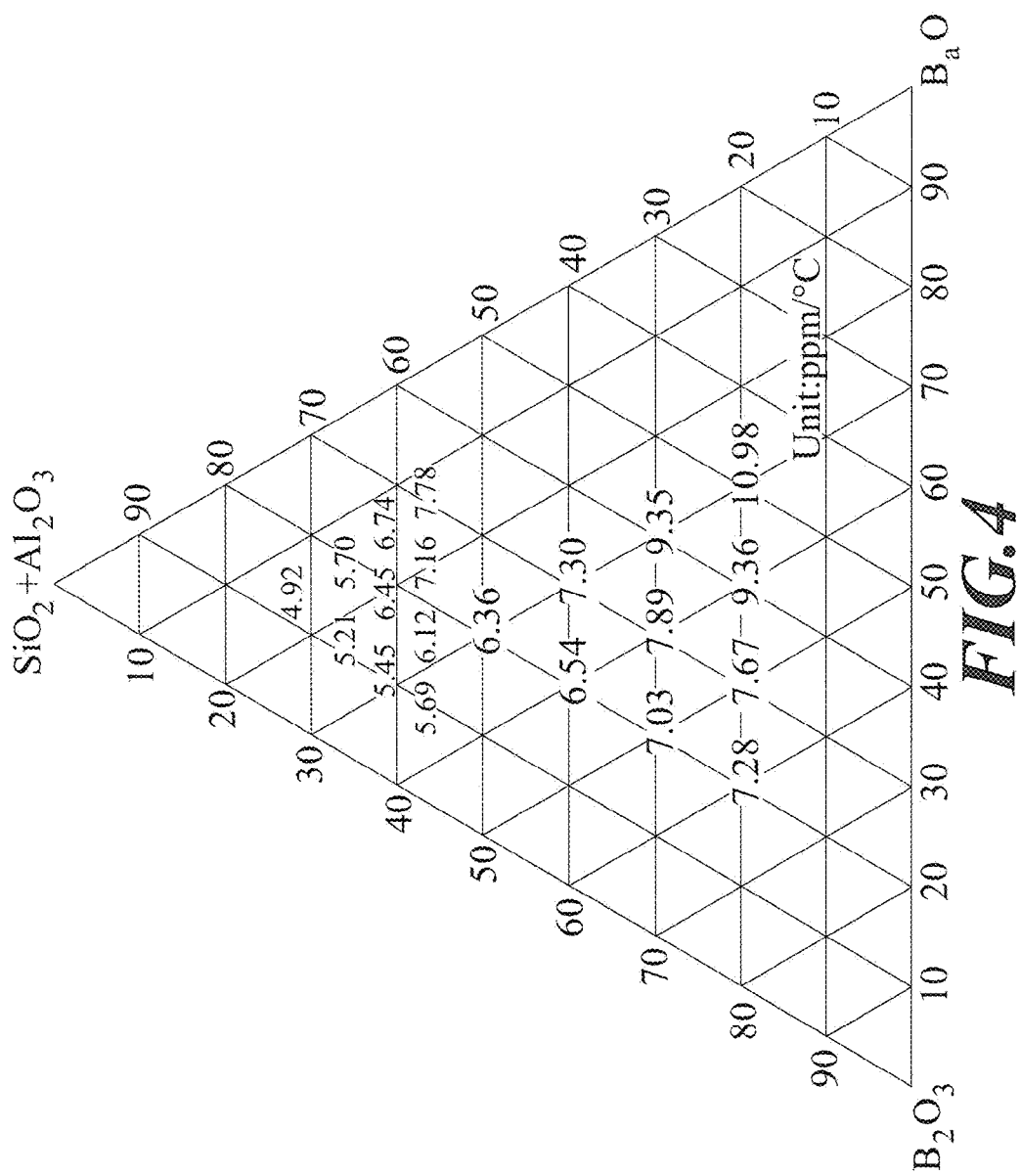
FIG. 4 is a diagram showing the relationship of the glass ingredients and expansion coefficient of the inventive glass-ceramic composite encapsulation material.
Figure 5:
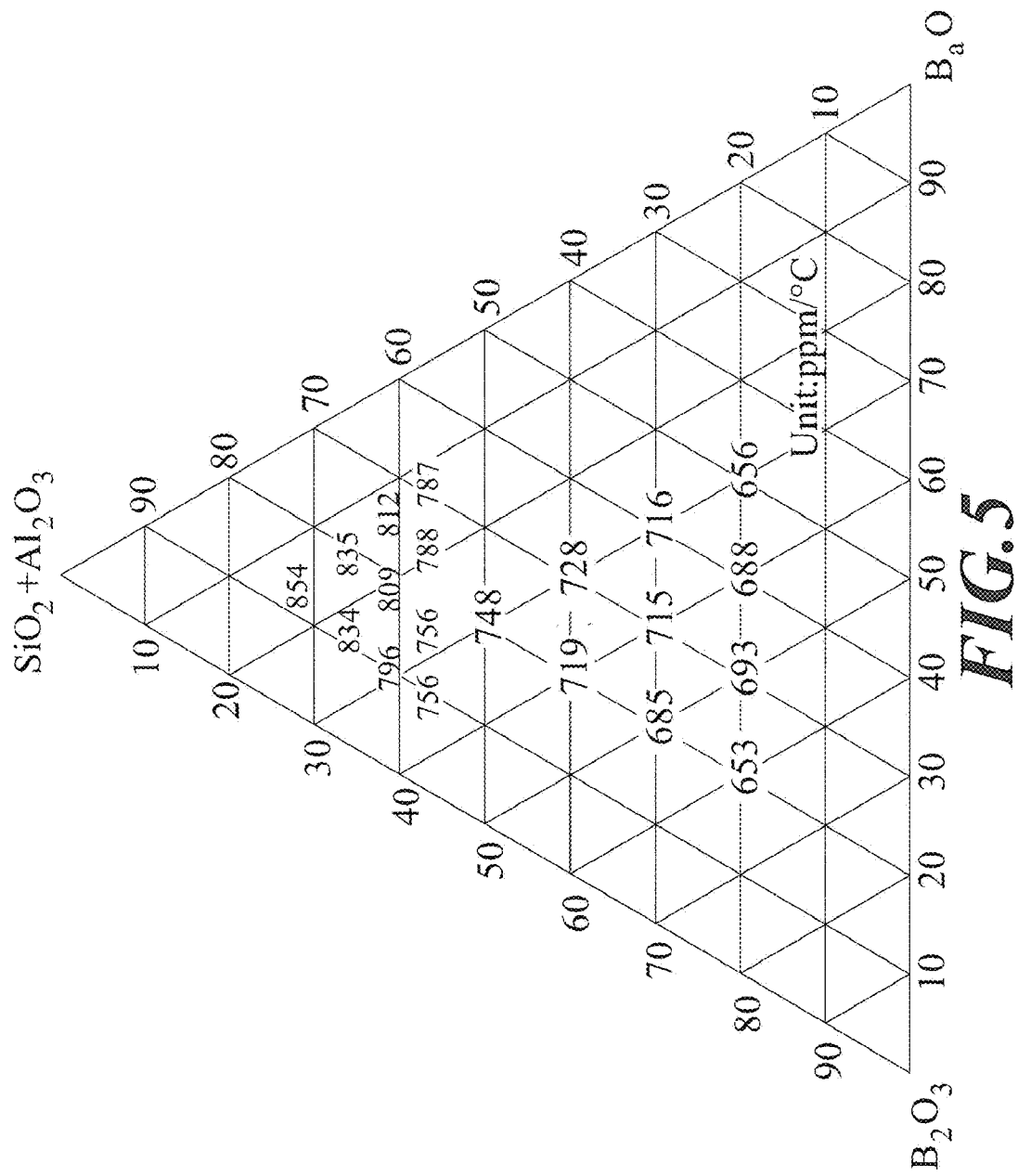
FIG. 5 is a diagram showing the relationship of the glass ingredients and softening point of the inventive glass-ceramic composite encapsulation material.

The effect of change in ratios of $B_2O_3$ and BaO on the property of glass has been investigated in this invention. For the convenience of expressing data, among all the four ingredients, the mole proportions of $Al_2O_3$ and $SiO_2$ are summed together, since $Al_2O_3$ acts as a glass structure intermediate agent and is present in the formulation at a constant proportion. As shown in FIG. 2, the content ranges of ingredients used in the glass matrix of the inventive glass-ceramic composite encapsulation material are distributed and numbered as P00-P09 and L00-L09. The measurements of each glass as-synthesized were compiled in Table 1 and 2 below. Relationships of ingredients with specific gravity, expansion coefficient, and softening point of glass are shown in FIGS. 3, 4 and 5, respectively.

TABLE 1

The formulation of a high temperature type glass matrix

| | $SiO_2$ | $Al_2O_3$ | $B_2O_3$ | BaO | Specific gravity | Expansion coefficient ppm/° C. | Softening point ° C. |
|---|---|---|---|---|---|---|---|
| P00 | 63.1 | 7.6 | 16.7 | 12.6 | 2.61 | 4.92 | 854 |
| P01 | 58.1 | 7.6 | 16.7 | 17.6 | 2.57 | 5.21 | 834 |
| P02 | 58.1 | 7.6 | 21.7 | 12.6 | 2.83 | 5.70 | 835 |
| P03 | 53.1 | 7.6 | 16.7 | 22.6 | 2.55 | 5.45 | 796 |
| P04 | 53.1 | 7.6 | 26.7 | 12.6 | 2.82 | 6.45 | 809 |
| P05 | 53.1 | 7.6 | 21.7 | 17.6 | 3.07 | 6.74 | 812 |
| P06 | 48.1 | 7.6 | 16.7 | 27.6 | 2.54 | 5.69 | 756 |
| P07 | 48.1 | 7.6 | 31.7 | 12.6 | 2.78 | 6.12 | 756 |
| P08 | 48.1 | 7.6 | 26.7 | 17.6 | 3.05 | 7.16 | 788 |
| P09 | 48.1 | 7.6 | 21.7 | 22.6 | 3.24 | 7.78 | 787 |

TABLE 2

The formulation of an intermediate temperature type glass matrix

| | $SiO_2$ | $Al_2O_3$ | $B_2O_3$ | BaO | Specific gravity | Expansion coefficient ppm/° C. | Softening point ° C. |
|---|---|---|---|---|---|---|---|
| L00 | 45 | 5 | 30 | 20 | 2.95 | 6.36 | 748 |
| L01 | 35 | 5 | 40 | 20 | 2.88 | 6.54 | 719 |
| L02 | 35 | 5 | 30 | 30 | 3.39 | 7.30 | 728 |
| L03 | 25 | 5 | 50 | 20 | 2.80 | 7.03 | 685 |
| L04 | 25 | 5 | 40 | 30 | 3.27 | 7.89 | 715 |
| L05 | 25 | 5 | 30 | 40 | 3.65 | 9.35 | 716 |
| L06 | 15 | 5 | 60 | 20 | 2.74 | 7.28 | 653 |
| L07 | 15 | 5 | 50 | 30 | 3.19 | 7.67 | 693 |
| L08 | 15 | 5 | 40 | 40 | 3.63 | 9.36 | 688 |
| L09 | 15 | 5 | 30 | 50 | 3.92 | 10.98 | 656 |

Referring to FIG. 3, the relationship between glass ingredients and specific gravity of the inventive glass-ceramic composite encapsulation material is shown therein. It is known from the figure, in P series glass, major ingredients of P00 (specific gravity: 2.61) comprises $SiO_2$ and $B_2O_3$. Molecular weights of these two ingredients are low, and it can be expected that glass formed therefrom tends to have a lower specific gravity. P06 (specific gravity: 2.54) is lighter than P00. Similarly, in the L series glass, L06 (specific gravity:

2.74) is lighter than L00 (specific gravity: 2.95). This indicates that, under conditions involving identical BaO content, the specific gravity of glass containing more $B_2O_3$ will be less than that of glass containing more $SiO_2$. Of course, the high molecular weight of BaO has a considerable effect on the specific gravity of the glass. Among glass used in the invention, L09 (specific gravity: 3.92), i.e., the formulation with the highest BaO content, has the highest specific gravity.

FIG. 4 is a diagram showing the relationship of glass ingredients in the inventive glass-ceramic composite encapsulation material and expansion coefficient. An increasing tendency of expansion coefficient can be found from the figure. An expansion coefficient of only 4.92 ppm/° C. was found in P00 with the highest $SiO_2$ content. Since the expansion coefficient of pure $SiO_2$ (quartz) glass is very low, it could be expected that the increase of $B_2O_3$ content would increase its expansion coefficient. As the content increased up to that of P06, the expansion coefficient was increased up to 5.69 ppm/° C., while the expansion coefficients of L00 to L06 were increased from 6.36 ppm/° C. to 7.28 ppm/° C. Since BaO plays a role as a glass structure modifier and exhibited stronger structure interrupting ability, it could increase the expansion coefficient of L09 to up to 10.98 ppm/° C. Major glass ingredients of L09 match well with those required by the expansion coefficient of electrolyte 8YSZ used in solid oxide fuel cells, with a matching interval of about 10±1 ppm/° C. In addition, the range of expansion coefficient of its Si—Al—B—Ba glass main system was between 5 to 10 ppm/° C.

FIG. 5 is a diagram showing the relationship between glass ingredients and softening point of the inventive glass-ceramic composite encapsulation material. A softening point is one of the important parameters of an encapsulating glass, which determines the lowest encapsulation temperature of glass and indicates the applicable temperature range of the glass. The detection method of this data was based on a method using an Orton SP-3A instrument with a accuracy higher than that obtained with a dilatometer. It is shown from the figure that, with respect to $SiO_2/B_2O_3$, the softening point was reduced from 854° C. in P00 to 756° C. in P06 and from 748° C. in L00 to 653° C. in L06. It is suggested that since the above-mentioned BaO was a strong glass structure modifier and had a high atomic mass, it acts to greatly reduce the softening point of the glass, and as a result, the softening point in P09 was 787° C., whereas the softening point of L09 was reduced to 656° C.

Figure 6:
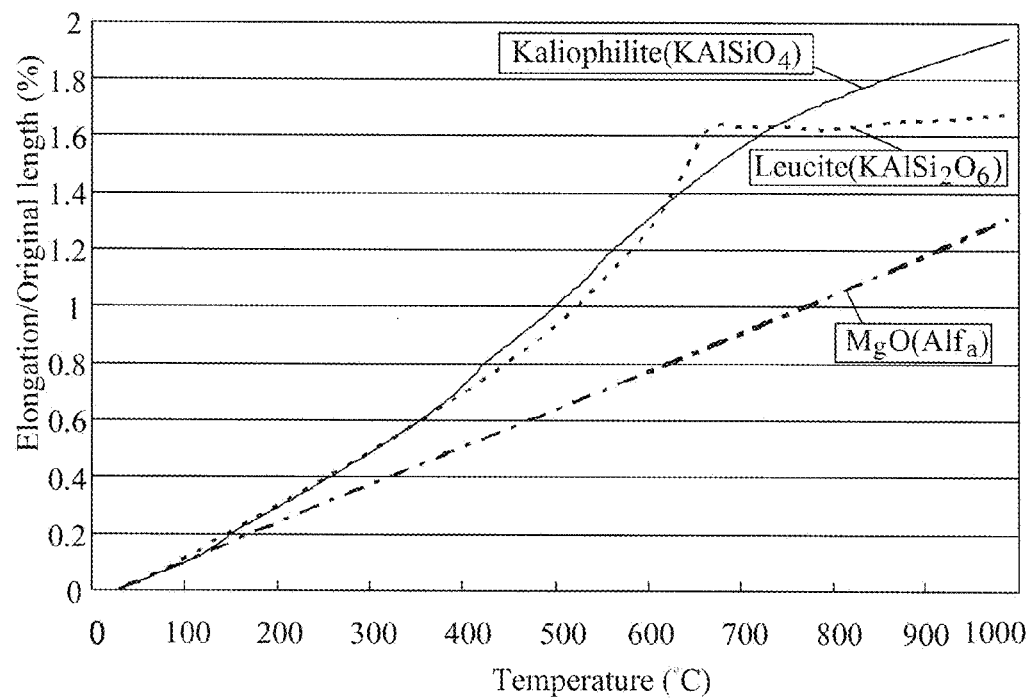
FIG. 6 is a graph comparing expansion coefficient curve of high expansion powders of the inventive glass-ceramic composite encapsulation materials.

FIG. 6 is a graph comparing the expansion coefficient curves of various high expansion powders of the inventive glass-ceramic composite encapsulation material. Since the glass filler incorporated in the glass matrix of a high temperature type glass encapsulation material could adjust the thermal expansion coefficient of the material, it is shown from the graph that leucite and kaliophilite could result in relatively high expansion coefficient. It is also shown from the graph that a high expansion coefficient of 20.47 ppm/° C. (30° C. to 530° C.) was obtained from leucite, and 21.68 ppm/° C. from kaliophilite, while MgO presented a stationary linear expansion of 13.44 ppm/° C.

Figure 7:
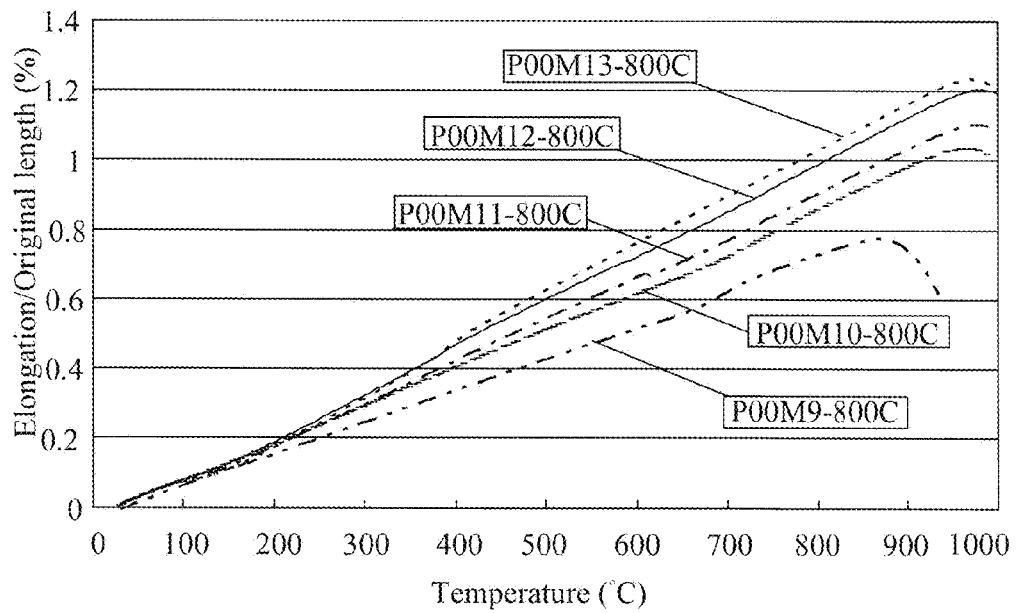
FIG. 7 is a graph showing expansion curve of glass P00 and MgO composites in the inventive glass-ceramic composite encapsulation material.

FIG. 7 is graph showing the expansion curves of glass P00 and MgO composites in the inventive glass-ceramic composite encapsulation material. It is shown in the graph that the result obtained from powders of glass P00 and MgO composites after heat treatment at 800° C. for 1 hour presented no abnormality, and expansion coefficients thereof matched the expected design range.

Figure 8:
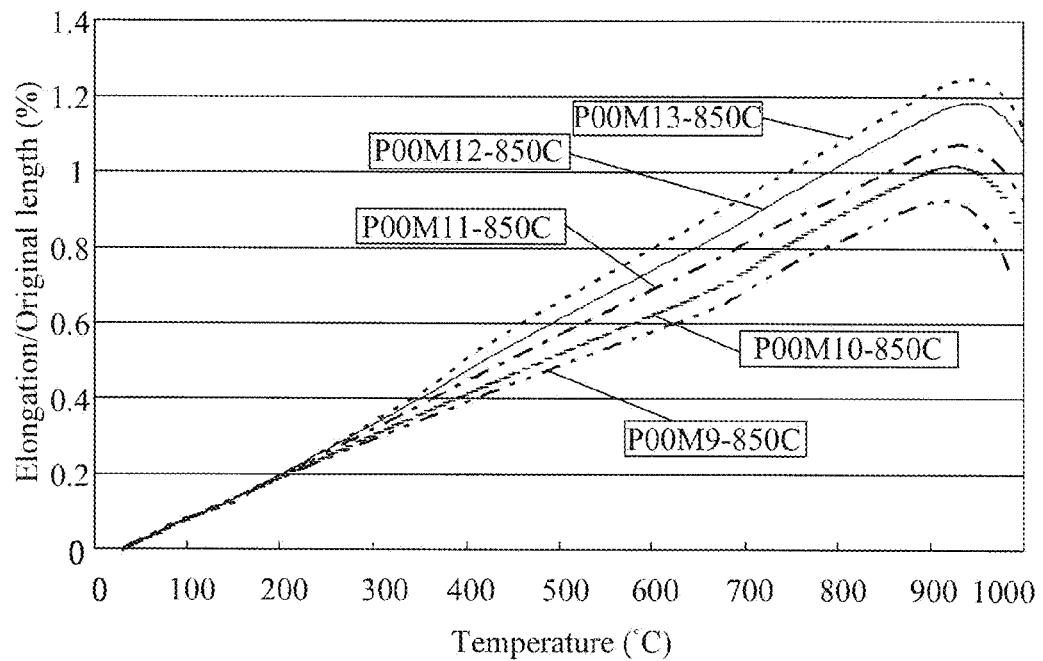
FIG. 8 is a graph showing expansion curves of glass P00 and MgO composites in the inventive glass-ceramic composite encapsulation material after heat treated at 850° C. for 1 hr.
Figure 9:
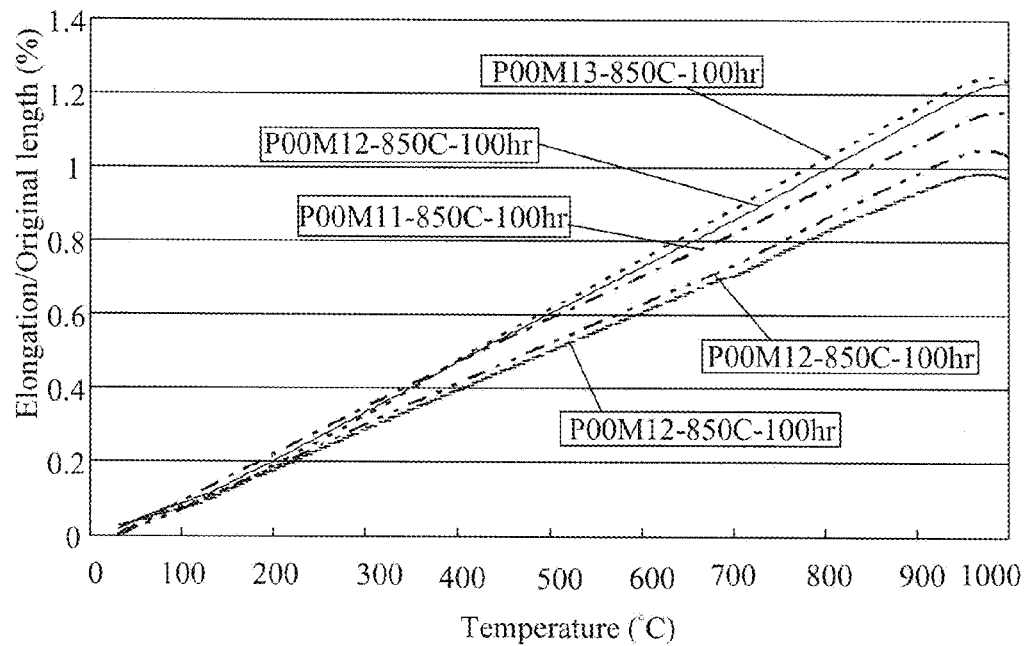
FIG. 9 is a graph showing expansion curves of glass P00 and MgO composites in the inventive glass-ceramic composite encapsulation material after heat treated at 850° C. for 100 hrs.

Referring to FIGS. 8 and 9, it is a graphs show expansion curves of glass P00 and MgO composites in the inventive glass-ceramic composite encapsulation material after long term heat treatment. Heat treatment on composite material carried out at a temperature near the softening point of glass could accelerate the generation of the crystallization phase, and therefore, heat treatments at 850° C. for one hour and at 850° C. for 100 hours were carried out. FIGS. 8 and 9 show that the expansion curves of glass P00 and MgO composites after heat treatment exhibited a consistent stable linear change at temperatures lower than 900° C., and a decreased softening expansion curve beginning at a temperature of higher than 900° C. After being subjected to the above-mentioned test, the expansion coefficient values obtained from 30° C. to 530° C. was compared and the data thus-obtained was listed in Table 3

TABLE 3

Expansion coefficients of glass P00 and MgO composites after adjustment (unit: ppm/° C.)

| Heat treatment | P00M9 9%/vol % MgO | P00M10 10%/vol | P00M11 11%/vol | P00M12 12%/vol | P00M13 13%/vol |
|---|---|---|---|---|---|
| 800° C./1 hr | 9.19 | 10.73 | 11.41 | 12.65 | 13.19 |
| 850° C./1 hr | 10.34 | 11.01 | 12.03 | 13.06 | 14.07 |
| 850° C./100 hr | 11.15 | 10.22 | 12.50 | 12.49 | 13.22 |

Figure 10:
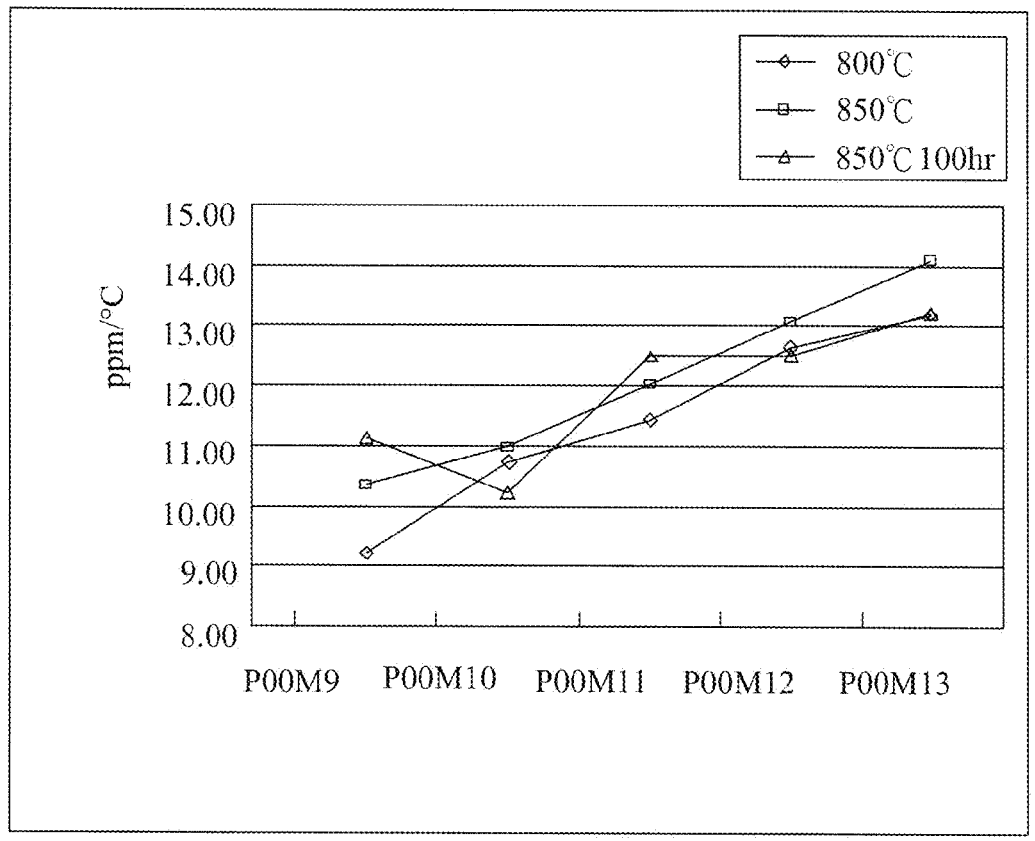
FIG. 10 is a graph showing the change interval in the heat treatment of glass P00 and MgO in the inventive glass-ceramic composite encapsulation material.

FIG. 10 is a graph showing the change interval of heat treatment on the glass P00 and MgO composites in the inventive glass-ceramic composite encapsulation material. It is shown from the figure that, among all the shifts in each set of expansion coefficients under treatment, the expansion coefficient obtained under heat treatment at 800° C. for one hour resulted in a slightly higher value than was originally designed, but did not deviated too much. The expansion coefficient value obtained under heat treatment at 850° C. for one hour was somewhat higher than that obtained at 800° C. for one hour, while long term heat treatment at 850° C. for 100 hours was even higher but was still within a controllable range.

Figure 11:
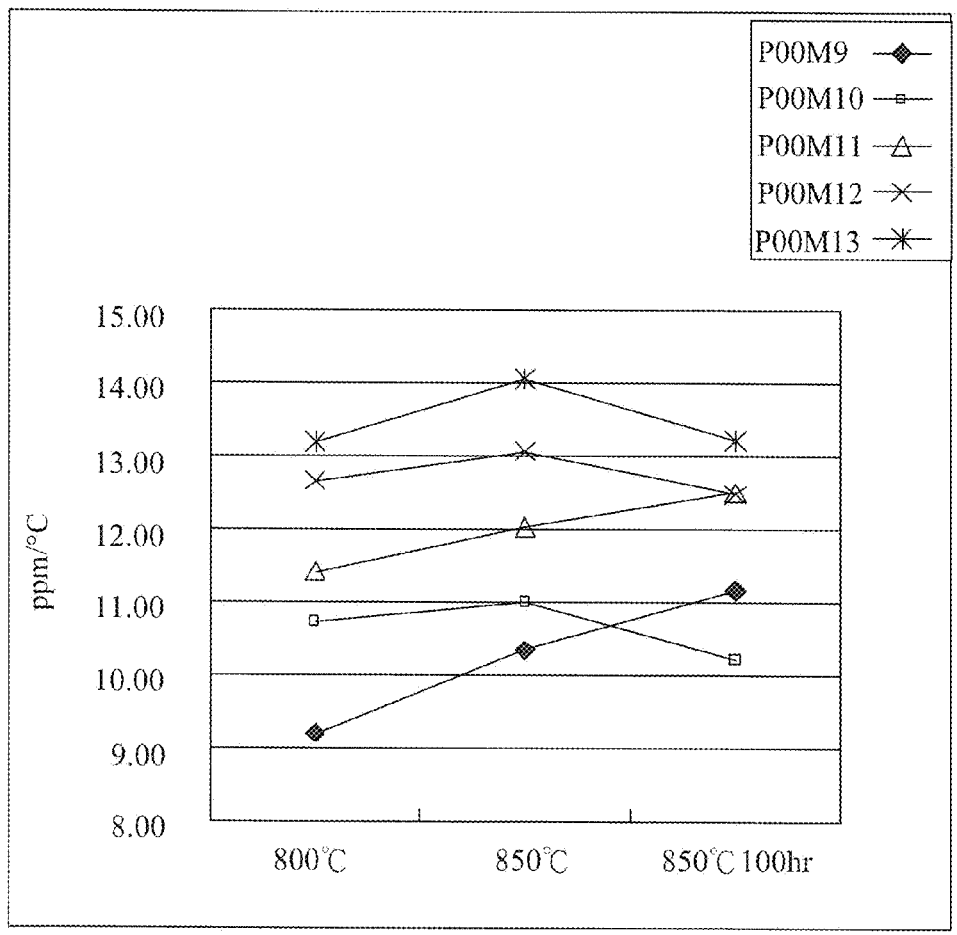
FIG. 11 is a graph showing the change interval of heat treatment on the glass P00 and MgO composites in the inventive glass-ceramic composite encapsulation material.

FIG. 11 is a graph showing the change interval of heat treatment on the glass P00 and MgO composites in the inventive glass-ceramic composite encapsulation material. It is shown from the figure that, among the shifts in each set expansion coefficient under treatment at each temperature, the expansion coefficient obtained under heat treatment on P00M9 and P00M11 would deviate upwardly and deviated from the value originally set 1-2 ppm/° C., while expansion coefficients obtained from P00M10, P00M12, and P00M13 expanded at first, but then dropped downward with a final value deviating from the value originally set by not more than 0.51 ppm/° C.

Figure 12:
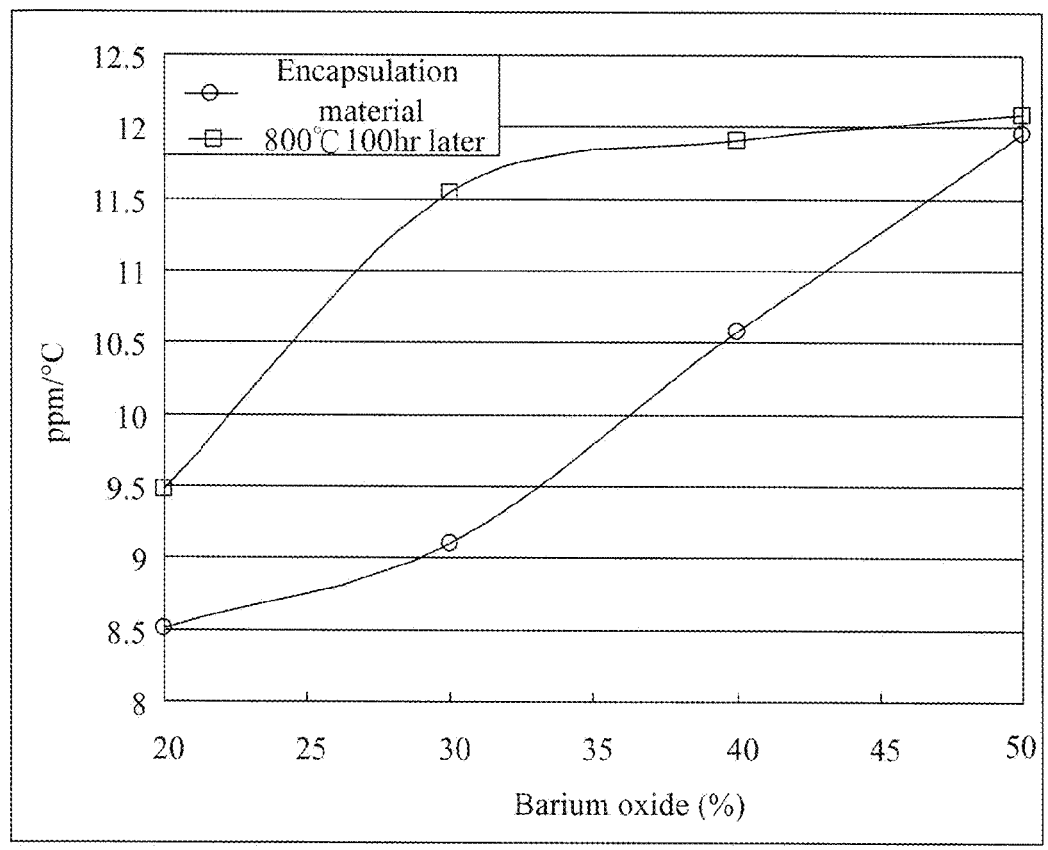
FIG. 12 is a graph showing the expansion coefficient range of the inventive intermediate temperature type of glass-ceramic composite encapsulation material.

FIG. 12 is a graph showing the expansion coefficient range of the intermediate type glass encapsulation material in the inventive glass-ceramic composite encapsulation material. Glass filler had been incorporated in the glass matrix of the intermediate type glass encapsulation material to adjust the thermal expansion coefficient thereof. Several groups of parameters resulted in the best performance in the invention and are depicted in this figure to show the relationship of BaO mol % versus the expansion coefficient (wherein composite the material with 70 vol % L07 and 30 vol % MgO are abbreviated as L07M30, composite material with 80 vol % L06 and 20 vol % MgO are abbreviated as L06M20, composite material with 70 vol % L08 and 30 vol % MgO are abbreviated as L08M30, and composite material with 60 vol % L09 and 40 vol % MgO are abbreviated as L09M40). Expansion coefficients were determined once more after heat treatment of all formulations at 800° C.-100 hr and compared. It was found that, as the BaO content was increased higher than 30%, the expansion coefficient of the finally formed material would become higher than 11.5 ppm/° C. The addition of MgO powder with a high expansion coefficient had the effect of adjusting expansion coefficient, enabling it to readily reach an ideal expansion coefficient of 8-12 ppm/° C.

The glass-ceramic composite encapsulation material provided according to the invention has the following advantages over other conventional techniques:

1. The inventive glass-ceramic composite encapsulation material can adjust the expansion coefficient and softening point as required in a certain range, and thus can produce an encapsulation material suitable for SOFC by means of an identical process under this mode.
2. The inventive glass-ceramic composite encapsulation material comprises a glass matrix that is formed with four kinds of low cost ingredient materials at various formulation ratios, and achieves the additional objectives of lowering the softening point of glass encapsulation material, having a good air tightness and a controllable thermal expansion coefficient, as well as compression sealing. Furthermore, products derived from the inventive material can sufficiently fulfil the encapsulation requirement of the present solid oxide fuel cell.

The foregoing detailed description gives a concrete illustration of a practical embodiment of the invention, however, this is not intended to limit the patent right scope of the invention. Equivalent modifications or variations not deviating from the art or spirit of the invention are intended to fall within the patent scope of the invention.

Many changes and modifications in the above-described embodiment of the invention can, of course, be carried out without departing from the scope thereof. Accordingly, to promote the progress in science and useful arts, the invention is disclosed and is intended to be limited only by the scope of the appended claims.

What is claimed is:

1. A glass-ceramic composite encapsulation material, comprising a glass matrix and a glass filler; wherein said glass matrix is based on materials selected from the group consisting of $SiO_2$, $Al_2O_3$, BaO and $B_2O_3$, and is mixed with said glass filler to form a glass-ceramic composite; wherein said glass filler comprises kaliophilite.

2. A glass-ceramic composite encapsulation material as in claim 1, wherein said glass filler is used to adjust encapsulation expansion coefficient, and to form a glass-ceramic composite encapsulation material.

3. A glass-ceramic composite encapsulation material as in claim 1, wherein the material of said glass matrix comprises:
   a high temperature type glass matrix, wherein said high temperature type glass matrix has
   a softening point of 750-850° C.;
   and
   an intermediate temperature type glass matrix, wherein said intermediate temperature type glass matrix has a softening point of 650-750° C.

4. A glass-ceramic composite encapsulation material as in claim 3, wherein the total mole percentage of $SiO_2$ and $Al_2O_3$ of said high temperature type glass matrix is 50-72 mol % of the total mole number of said high temperature type glass matrix.

5. A glass-ceramic composite encapsulation material as in claim 3, wherein the mole percentage of $Al_2O_3$ of said high temperature type glass matrix is 3-15 mol % of the total mole number of said high temperature type glass matrix.

6. A glass-ceramic composite encapsulation material as in claim 3, wherein BaO of said high temperature type glass matrix is a modifier for adjusting the softening point of glass, and the mole percentage of BaO of said high temperature type glass matrix is 10-30 mol % of the total mole number of said high temperature type glass matrix.

7. A glass-ceramic composite encapsulation material as in claim 3, wherein $B_2O_3$ of said high temperature type glass matrix is a modifier for adjusting the softening point of glass, and the mole percentage of $B_2O_3$ of said high temperature type glass matrix is 15-35 mol % of the total mole number of said high temperature type glass matrix.

8. A glass-ceramic composite encapsulation material as in claim 3, wherein said glass filler is 5% to 20% by volume of the total volume of said high temperature type glass matrix and said glass filler.

9. A glass-ceramic composite encapsulation material as in claim 3, wherein the total mole percentage of $SiO_2$ and $Al_2O_3$ of said intermediate temperature type glass matrix is 20-50 mol % of the total mole number of said intermediate temperature type glass matrix.

10. A glass-ceramic composite encapsulation material as in claim 3, wherein the mole percentage of $Al_2O_3$ of said intermediate temperature type glass matrix is 3-15 mol % of the total mole number of said intermediate temperature type glass matrix.

11. A glass-ceramic composite encapsulation material as in claim 3, wherein BaO of said intermediate temperature type glass matrix is a modifier for adjusting the softening point of glass, and the mole percentage of BaO of said intermediate temperature type glass matrix is 20-50 mol % of the total mole number of said intermediate temperature type glass matrix.

12. A glass-ceramic composite encapsulation material as in claim 3, wherein $B_2O_3$ of said intermediate temperature type glass matrix is a modifier for adjusting the softening point of glass, and the mole percentage of $B_2O_3$ of said intermediate temperature type glass matrix is 30-60 mol % of the total mole number of said intermediate temperature type glass matrix.

13. A glass-ceramic composite encapsulation material as in claim 3, wherein said glass filler is 20% to 40% by volume of the total volume of said intermediate temperature type glass matrix and said glass filler.

* * * * *